United States Patent
Halling (10) Patent No.: US 7,201,381 B2
(45) Date of Patent: *Apr. 10, 2007

(54) METALLIC SEAL

(75) Inventor: Horace P. Halling, Durham, CT (US)

(73) Assignee: American Seal and Engineering Company, Inc., Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,162

(22) Filed: Oct. 27, 2005

(65) Prior Publication Data

US 2006/0255548 A1 Nov. 16, 2006

Related U.S. Application Data

(63) Continuation of application No. 10/629,501, filed on Jul. 29, 2003, now Pat. No. 6,983,940.

(51) Int. Cl.
*F16J 21/025* (2006.01)
*F16J 15/02* (2006.01)

(52) U.S. Cl. .................. 277/604; 277/614; 277/616; 277/644; 277/647

(58) Field of Classification Search ................ 277/604, 277/614, 616, 626, 643–644, 647
See application file for complete search history.

(56) References Cited

U.S. PATENT DOCUMENTS

| 4,336,943 A | * | 6/1982 | Chaplin | 277/643 |
| 5,158,305 A | * | 10/1992 | Halling | 277/591 |
| 6,086,069 A | * | 7/2000 | Bedford | 277/380 |

* cited by examiner

*Primary Examiner*—Vishal Patel (74) *Attorney, Agent, or Firm*—Raymond Nuzzo (57) ABSTRACT

The present invention is directed to a resilient, annular, metallic seal member having a generally "j" shaped cross-section. The annular, metallic seal member includes a first end portion having a first distal end, a generally curled second end portion that extends to a second distal end, and a central body portion between and contiguous with the first and second end portions. The annular, metallic seal member has a first side and an opposite second side. The second end portion curls in a first direction in accordance with a predetermined radius such that the second distal end is located across from the first side of the annular, metallic seal member and the first and second distal ends do not face each other.

2 Claims, 11 Drawing Sheets

METALLIC SEAL

CROSS-REFERENCE TO RELATED APPLICATIONS

This application is a continuation of prior application Ser. No. 10/629,501, filed Jul. 29, 2003 now U.S. Pat. No. 6,983,940.

The entire disclosure of the aforesaid application Ser. No. 10/629,501 is hereby incorporated by reference.

BACKGROUND OF THE INVENTION

The present invention relates to a metallic seal for the containment of high pressure fluids, including gases, from cryogenic to highly elevated temperatures. More particularly, the present invention relates to pressure-energized, annular metallic lip seals with lateral offset, angular and axial misalignment capability.

In the field of fluid containment of high pressure fluids, resilient metallic seals are employed in applications where elastomeric and polymeric materials cannot be used because of extremely high pressures, high temperatures and/or aggressive media. Such sealing devices are produced in different configurations designed to meet a variety of operating requirements.

Figure 1A:
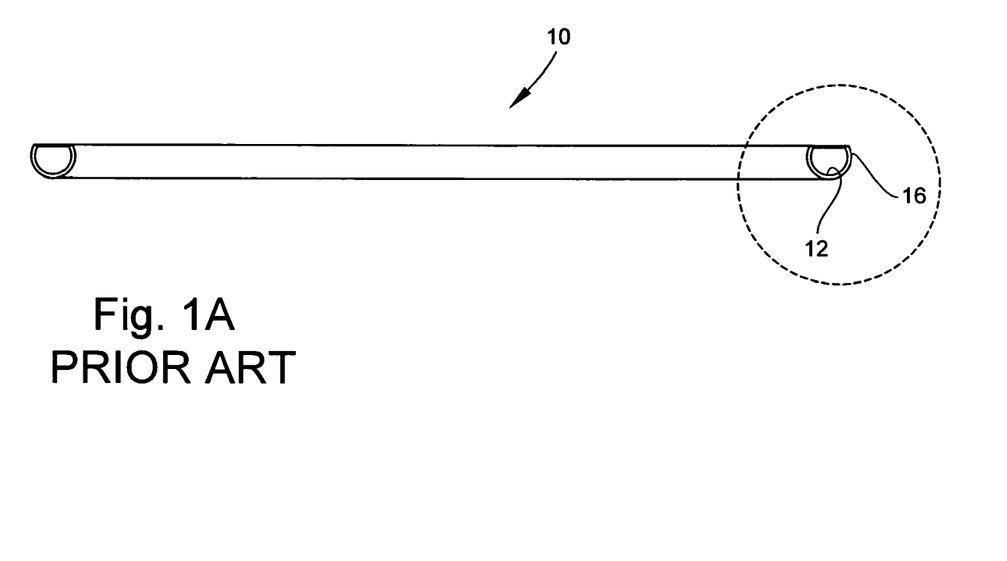
FIG. 1A is a side view, in longitudinal section, of a prior art axial c-seal.
Figure 1B:
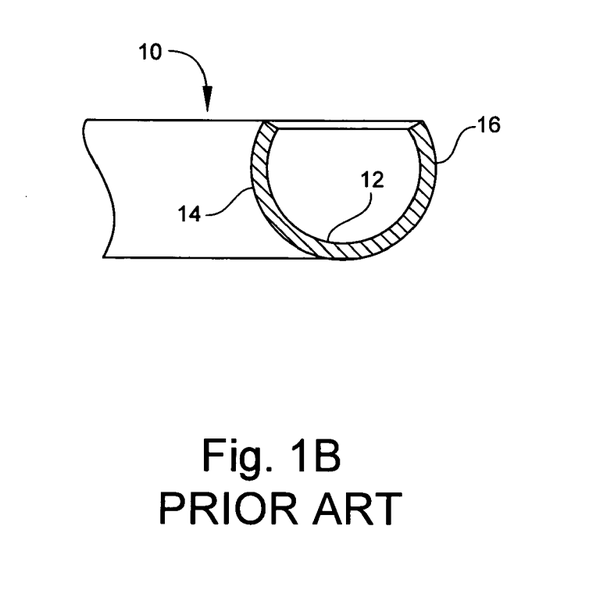
FIG. 1B is a enlarged view of a portion of the view shown in FIG. 1A.

One such seal is the "Axial C-Seal", shown in FIGS. 1A and 1B, which was developed as an improvement in flexibility over the hollow metal o-ring. Like the metal o-ring, the axial c-seal may be used to seal gaps between cylindrical surfaces, in mainly static applications.

Other seals have been developed to perform this function, for example, those shown in the following U.S. Pat. Nos. 4,457,523; 4,854,600; 5,799,954; 6,257,594; and 6,446,978. All of these seals serve their purpose, but have limitations when required to be both pressure-energized and capable of accommodating significant misalignments of the cylindrical surfaces to be sealed.

In devices known as couplings, a rigid hollow proboscis or probe is inserted into a hollow receptacle in a fluid transmission system. The receptacle contains a sealing ring or multiple sealing rings, which are dilated by the inserted probe, thereby creating the required contact stresses to achieve fluid containment between the two bodies to be sealed together.

C-seals are presently employed in couplings. Occasionally, due to imperfect field installation practices, the probe will be forced into the receptacle before the centerlines or axes of the two components are properly aligned. When this occurs, the probe may dent one side of the c-seal, which may not be sufficiently resilient to elastically deform, and therefore may leave a gap on the opposite side which results in leakage of fluid when the joint is pressurized.

It is highly desirable to provide an improved metallic seal which overcomes the foregoing problems.

SUMMARY OF THE INVENTION

In accordance with the present invention it has now been found that a metallic seal has been provided which obtains the foregoing objectives.

The metallic seal of the present invention has a C-shaped portion which connects to a longitudinally extending portion. The c-shaped portion desirably has a discrete radius with a smaller radius than the axial c-seal, to prevent contact between the probe and this relatively rigid area during installation. The inside diameter of the c-shaped portion is desirably extended axially towards the end of the c-shaped portion and towards a first end of the seal, and slightly inwardly, desirably terminating in a small inwardly curled portion forming a lip. The opposed portion of the c-shaped portion connects to a longitudinally extending portion which extends above or beyond the c-shaped portion and which desirably terminates in a small outwardly curved portion. The overall configuration of the seal is somewhat L-shaped, or J-shaped.

In a related aspect, the present invention is directed to an annular seal member having a generally "j" shaped cross-section and comprising a first end portion having a first distal end, a generally curled second end portion that extends to a second distal end, and a central body portion between and contiguous with the first and second end portions. The annular seal member has a first side and an opposite second side. The second end portion curls in a first direction in accordance with a predetermined radius such that the second distal end is located across from the first side of the seal member and the first and second distal ends do not face each other.

In another aspect, the present invention is directed to an annular seal member comprising a first side and an opposite second side, a generally frustoconical central body portion having opposite ends, a first end portion contiguous with one of the opposite ends of the generally frustro-conical central body portion, and a generally curled second end portion contiguous with the other of the opposite ends of the generally frustro-conical central body portion. The first end portion has a first distal end. The second end portion extends to a second distal end. The second end portion curls in a first direction in accordance with a predetermined radius such that the second distal end is located across from the first side of the annular seal member and the first and second distal ends do not face each other.

In a further aspect, the present invention is directed to an annular seal member having a generally hook shaped cross-section, a first side and a second opposite side. The annular seal member comprises a first end portion having a first distal end, a generally curled second end portion that extends to a second distal end, and a central body portion between and contiguous with the first and second end portions. The second portion curls in a first direction in accordance with a predetermined radius such that the second distal end is located across from the first side of the annular seal member and the first and second distal ends do not face each other.

In another aspect, the present invention is directed to an annular metallic seal comprising a first side and an opposite second side, a generally frustro-conical central body portion having opposite ends, a first end portion contiguous with one of the opposite ends of the generally frustro-conical central body portion, and a curled second end portion contiguous with the other of the opposite ends of the generally frustro-conical central body portion. The first end portion has a first distal end. The second end portion extends to a second distal end. The generally frustro-conical central body has a thickness that tapers in the direction of the first distal end. The first distal end is slightly angulated in a first direction. The second end portion curls in the first direction in accordance with a predetermined radius such that the second distal end is located across from the first side of the annular metallic seal and the first and second distal ends do not face each other.

Further features and advantages of the present invention will appear herein below.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Referring now to the drawings in detail, FIGS. 1A and 1B show views of a prior art axial c-seal 10, showing an arcuate portion 12, outer sealing line 14 and inner sealing line 16.

Referring to FIGS. 2A–2G, there are shown various views of the seal 20 of the present invention. Seal 20 comprises an arcuate portion 22, outer sealing line 24 and inner sealing line 26. Seal 20 includes an inward curl 28 at one end of the arcuate portion which forms a return 29 at a first edge 30 of seal 20, and the opposed end of the arcuate portion connects to an inwardly tapering frustro-conical portion or longitudinally extended portion 32 which terminates in an outward curved portion 34 to the second opposed edge 36 of seal 20. The function of the return 29 is to provide stiffening and a lead-in which facilitates assembly for the smooth insertion of the seal into an external cavity during installation.

Figure 2A:
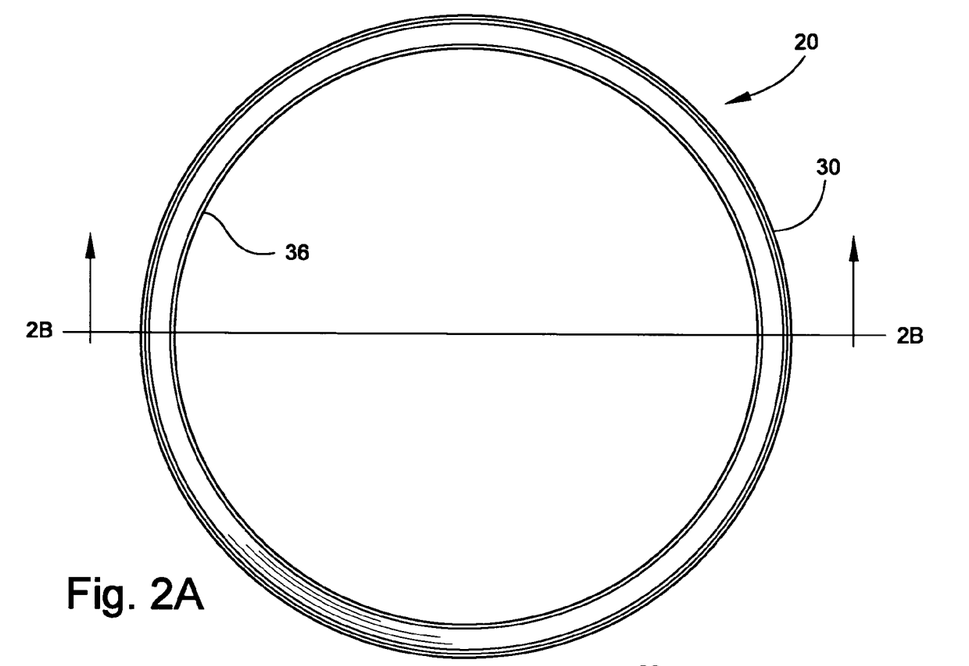
FIG. 2A is plan view of the annular seal member of the present invention.
Figure 2B:
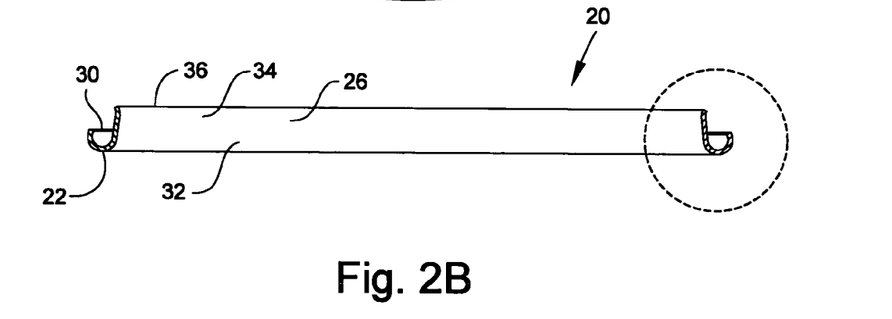
FIG. 2B is a side view, in longitudinal section, taken along line 2B—2B in FIG. 2A.
Figure 2C:
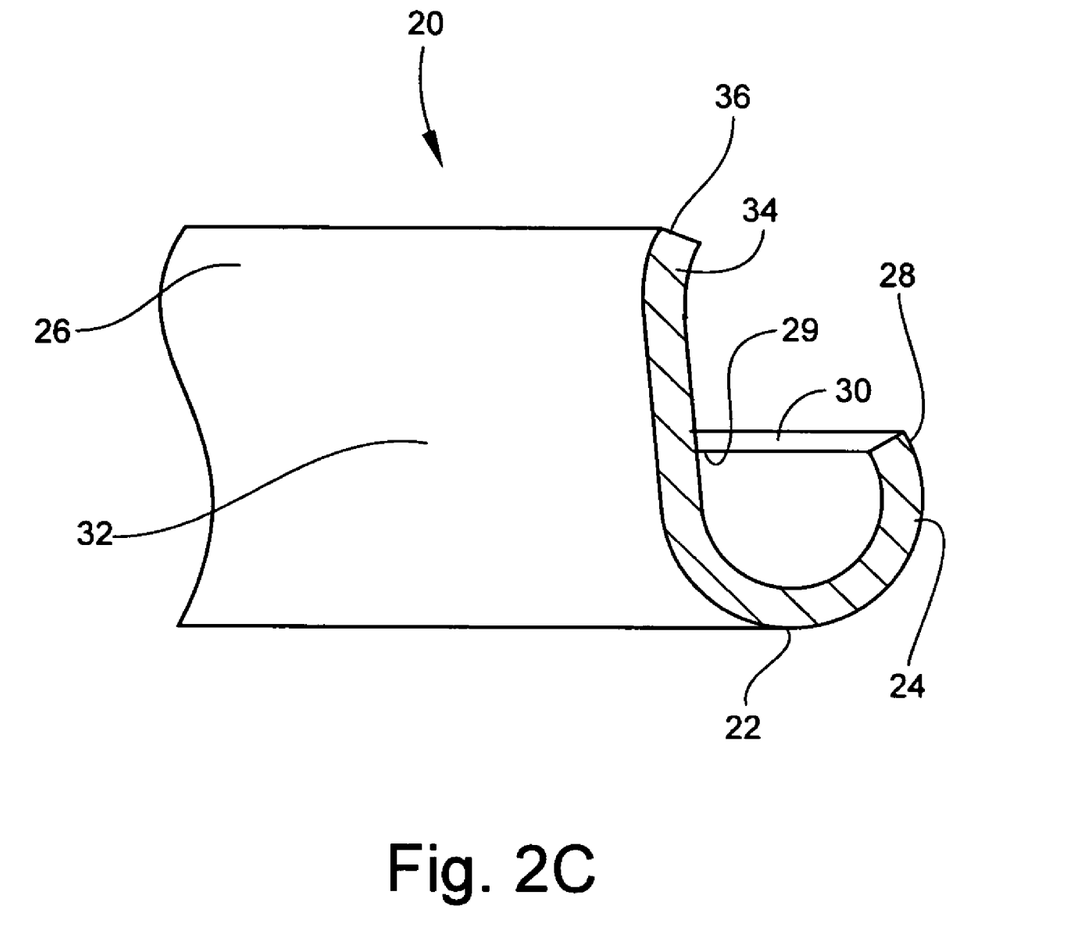
FIG. 2C is an enlarged view of the portion of the view shown in FIG. 2B.
Figure 2D:
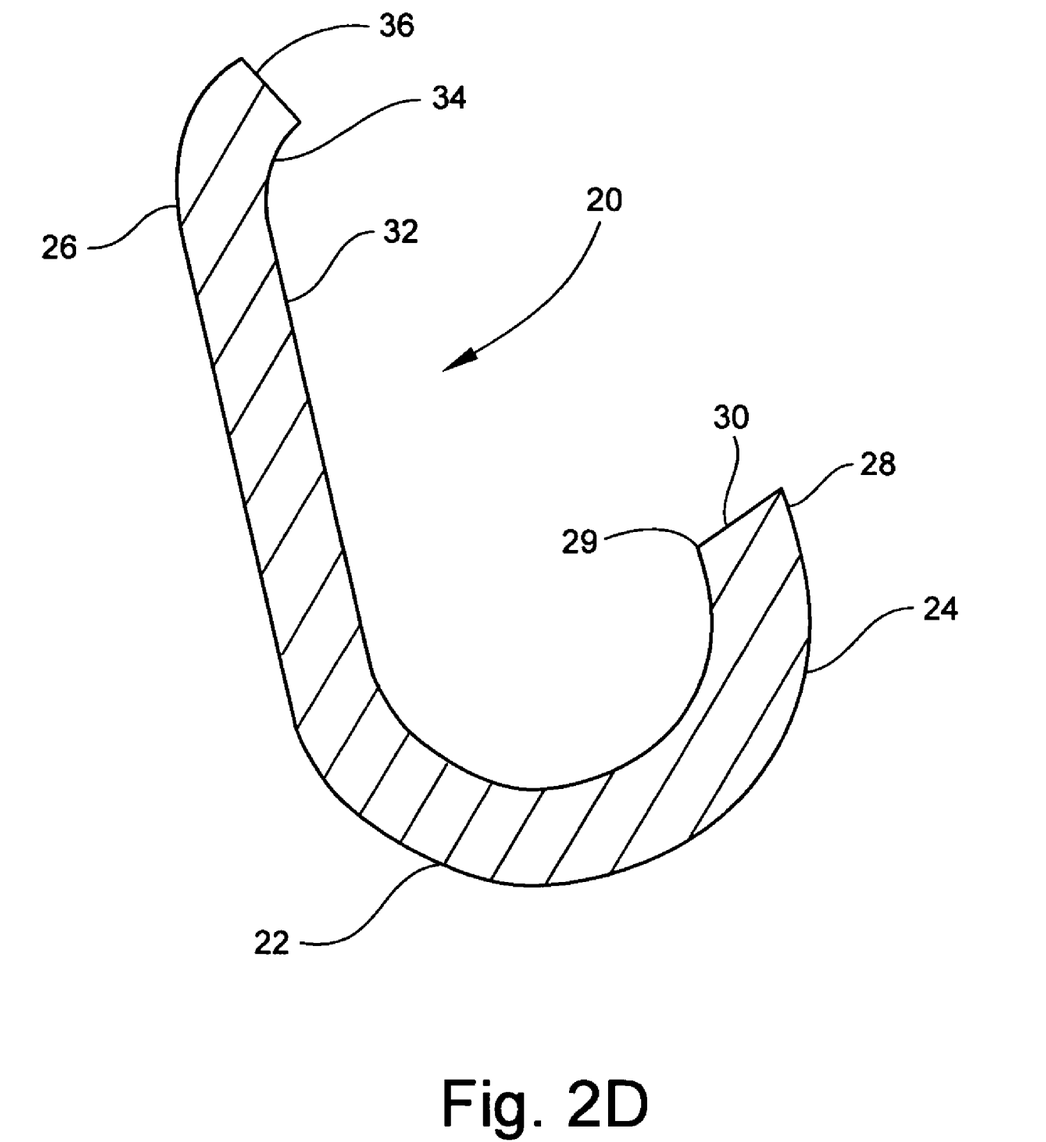
FIG. 2D is a cross-sectional view of the seal of the present invention.
Figure 2E:
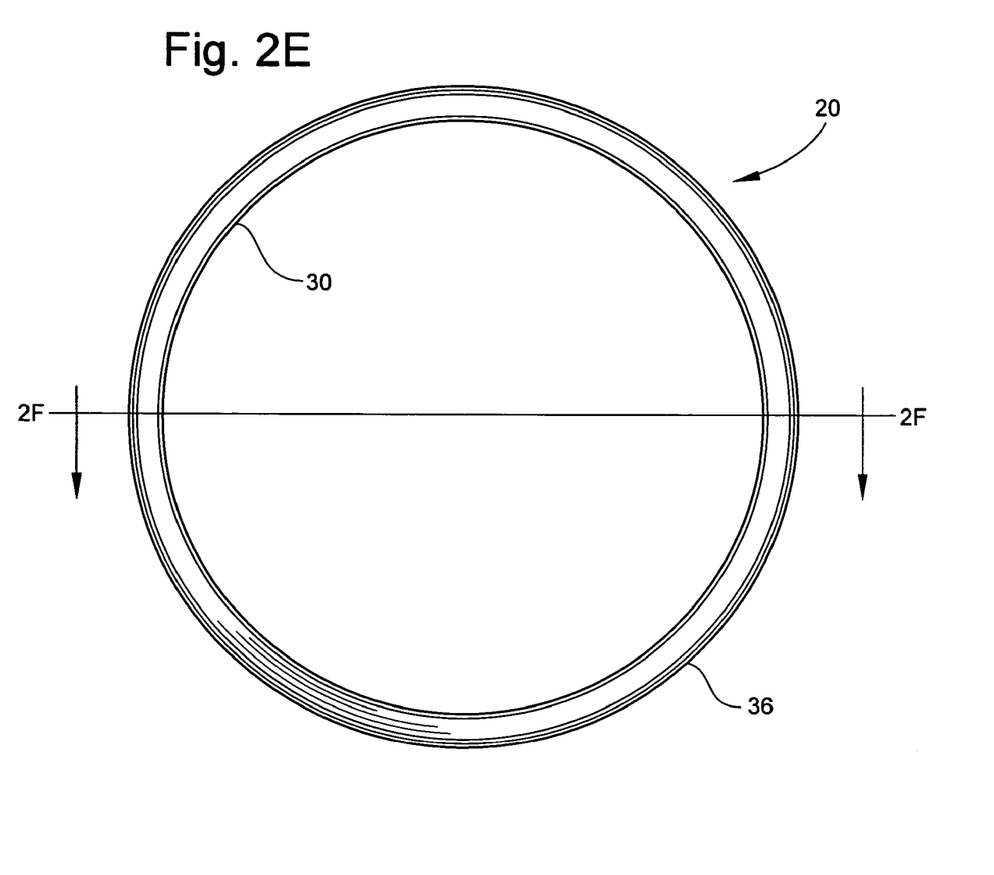
FIG. 2E is another plan view of the seal of the present invention.
Figure 2F:
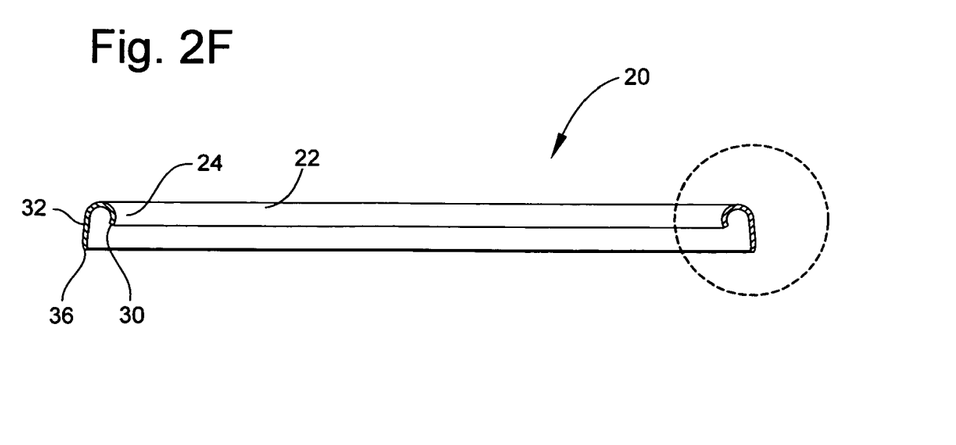
FIG. 2F is a side view, in longitudinal section, taken along line 2F—2F in FIG. 2E.
Figure 2G:
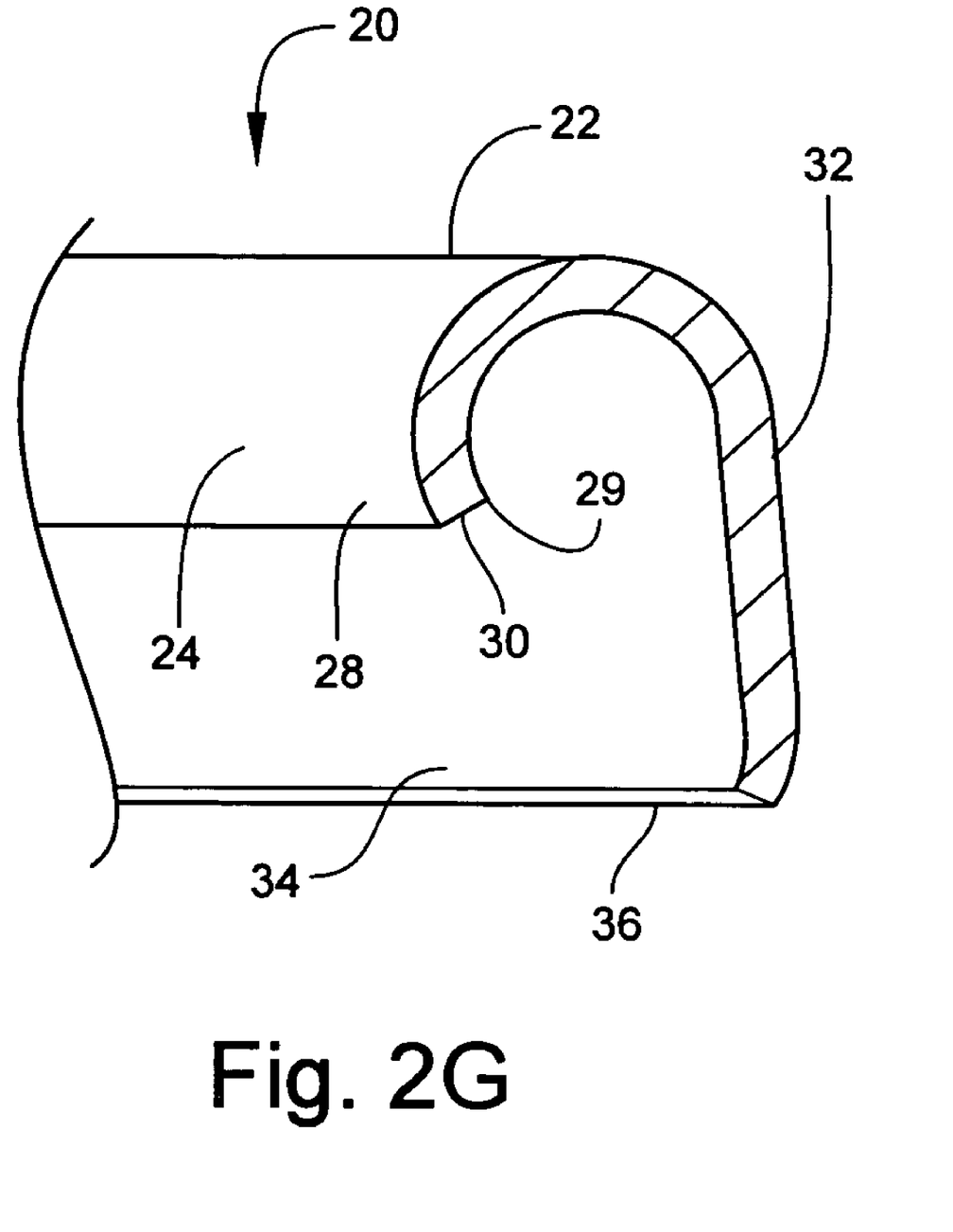
FIG. 2G is an enlarged view of a portion of the view shown in FIG. 2F.

FIG. 2C is an enlarged view of the portion of the view of FIG. 2B indicated by the dashed circle. Similarly, FIG. 2G is an enlarged view of the portion of the view of FIG. 2F indicated by the dashed circle.

Figure 3:
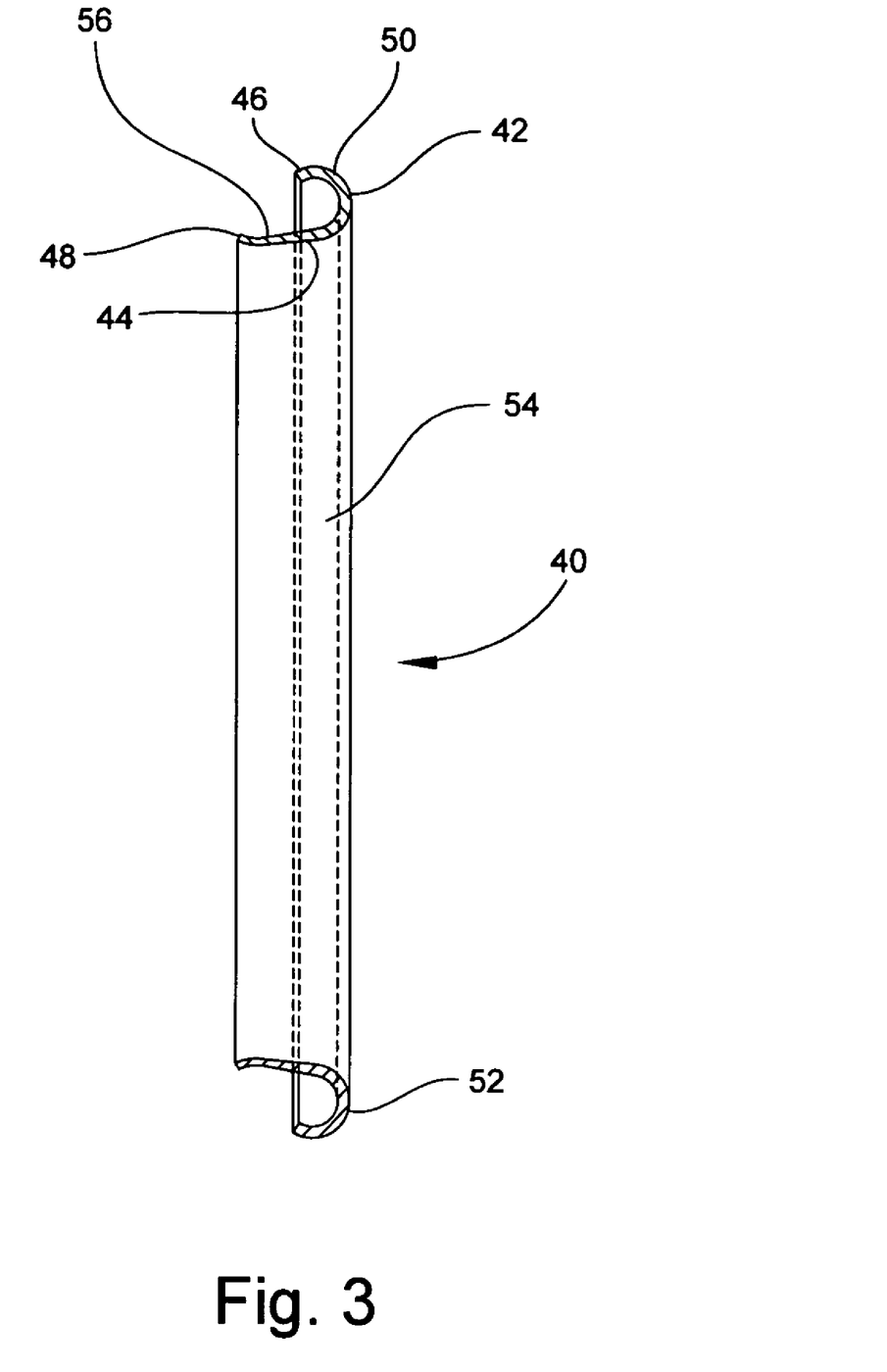
FIG. 3 is a side view, in longitudinal section, of the seal of the present invention.

FIG. 3 shows a side view of a further embodiment of the present invention. Seal 40 comprises arcuate portion 42, an inwardly tapered frustro-conical portion 44, inward curl 46 and outward curl 48. A first portion 50 is connected to a second portion 52 of seal 40 by longitudinally extending body portion 54, which depicts a preferred longitudinally extending body of the seals of the present invention. Seal 40 further includes a material taper 56 at the frustro-conical portion 44 wherein the thickness of the material forming seal 40 decreases to increase flexibility of seal 40.

The preferred materials for the seals of the present invention include nickel super alloys and nickel cobalt alloys, although other metals may be used.

The seal of the present invention has several significant advantages. One advantage is that the flexibility of the inward facing lip 29 is enhanced by increased distance from the more rigid c-shaped part of the section and it can be deflected radially by a lower force.

Another advantage is that the configuration of the frustro-conical portion 44 may be reshaped by deflecting relatively easily to accommodate an off-center probe without plastic deformation of this region.

A further advantage is that the seal of the present invention may be manufactured from a relatively thicker material stock in comparison to the prior art axial-c-seal without an appreciable increase in insertion force or galling tendencies.

Another advantage is that when the seal of the present invention is manufactured from relatively thicker material, in comparison to the prior art axial c-seal, the greater material thickness and a close proximity between the installed probe and the deflected inner frustro-conical leg of the ring cross-section allow for higher operating and proof pressures to be sustained without gross permanent deformation.

A further advantage of the seal of the present invention is enhanced reliability. Multiple insertions of the probe into prior art seals have been a problem for prior art seals.

Another advantage of the seal of the present invention results from the tapered cross-section of the frustro-conical portion. This flexible feature is advantageous for dynamic, sliding application, albeit at slow speeds, because of reduction of contact stresses.

Figure 4:
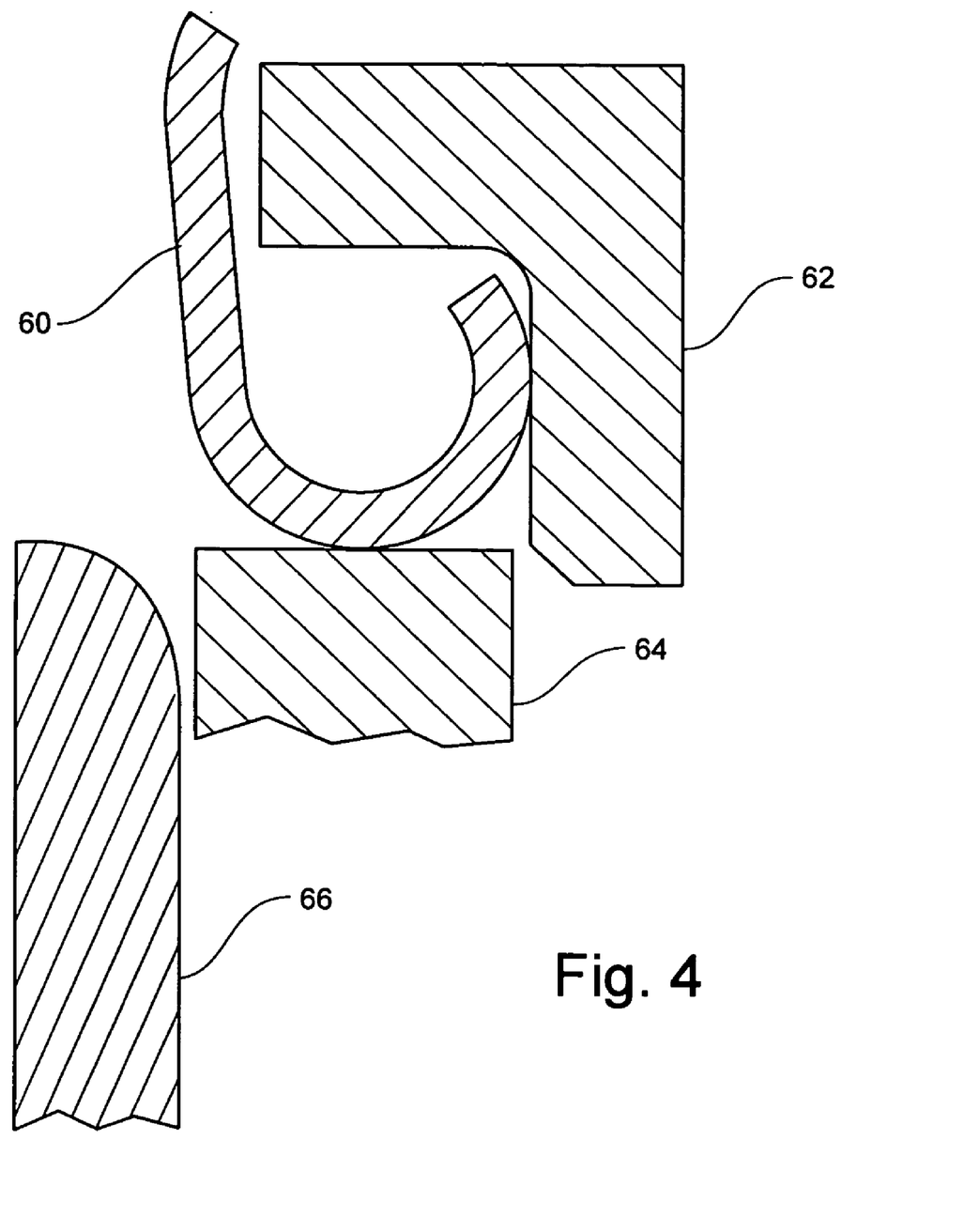
FIG. 4 is a schematic cross-sectional view of the installation of the seal of the present invention.
Figure 5:
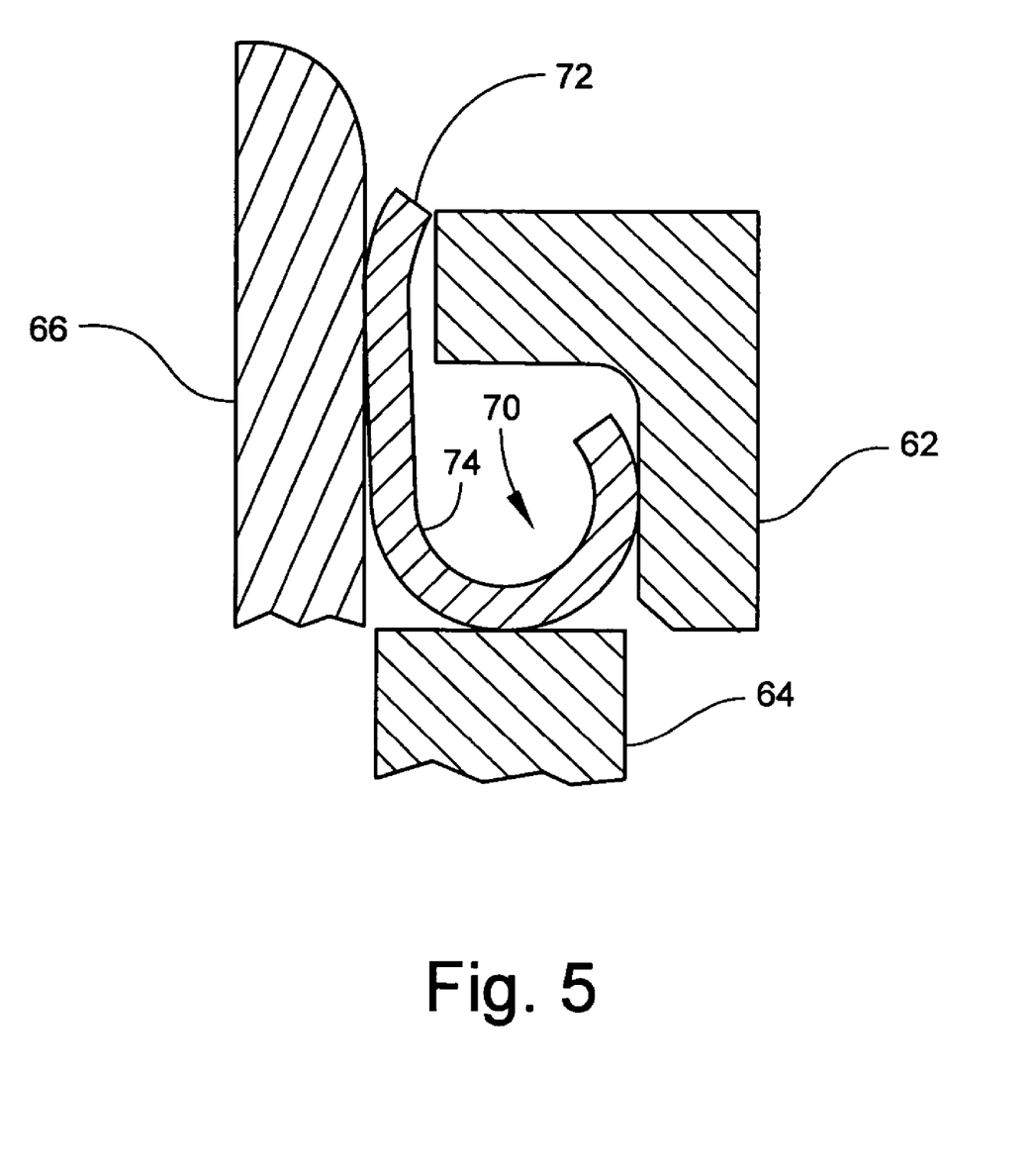
FIG. 5 is a schematic cross-sectional view of a seal of the present invention installed, with an axis of a probe displaced to the right.
Figure 6:
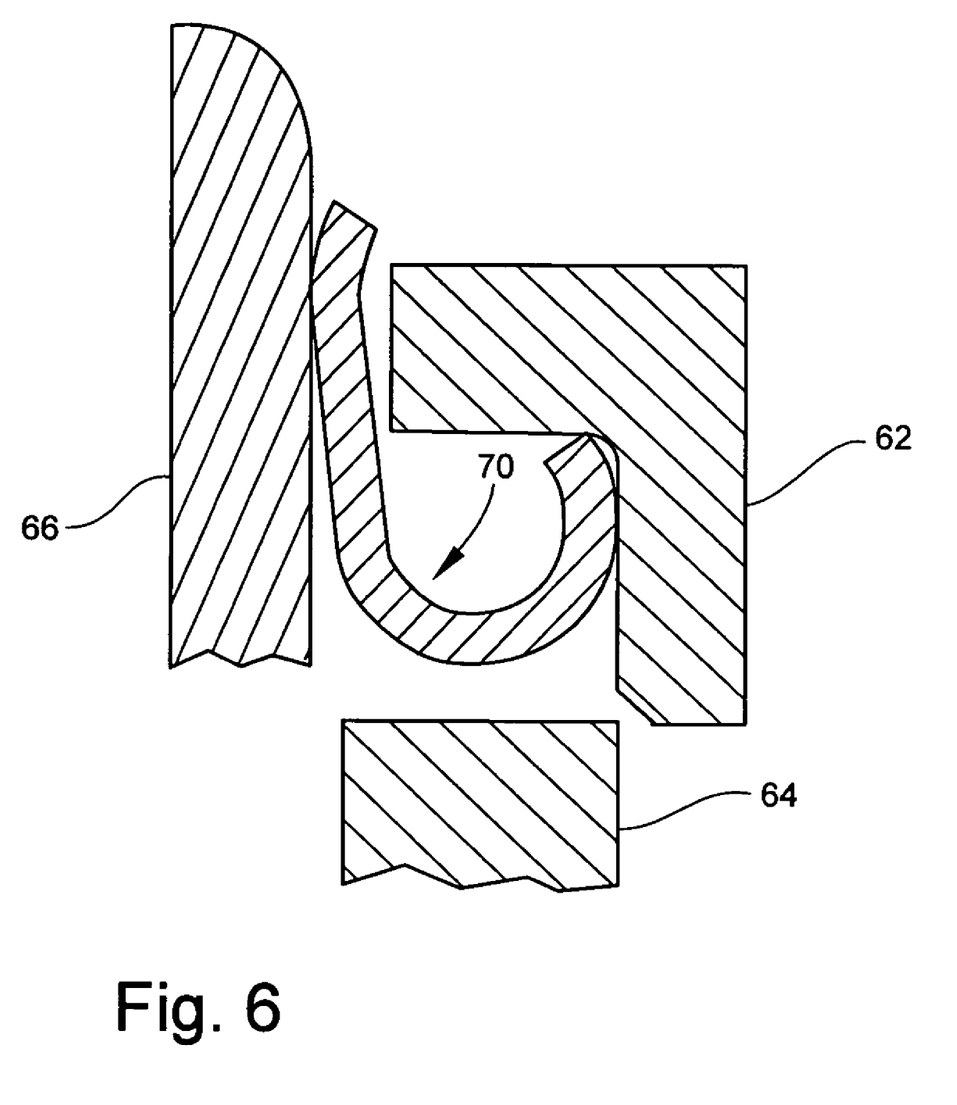
FIG. 6 is a schematic cross-sectional view of installed seal of the present invention with the axis of the probe displaced to the left.

Referring to FIG. 4, there is illustrated the installation of a seal of the present invention showing the insertion of the aforesaid seal in the body of a coupling. Seal 60 is installed in body 62 of a coupling, with retaining wall 64 positioned adjacent the seal and probe 66 spaced from the seal. Referring to FIG. 5, there is shown seal 70 in accordance with another embodiment of the present invention. Seal 70 comprises an outward curved portion 72 and frustro-conical portion 74. The seal 70 is installed in an interference relationship with body 62 and axial retaining wall 64, with probe 66 inserted in contacting, interfering relationship with the seal adjacent to the frustro-conical portion 74. Elastic deflection of the seal inner lip and tapered frustro-conical portion 74 permits lateral offset of the probe without leakage. The axis of probe 66 is displaced to the right vis-à-vis body 62. Referring to FIG. 6, there is shown a relationship similar to that shown in FIG. 5. However, the axis of the probe is displaced to the left vis-à-vis body 62, widening the gap between body 62 and the frustro-conical portion 74.

Figure 7:
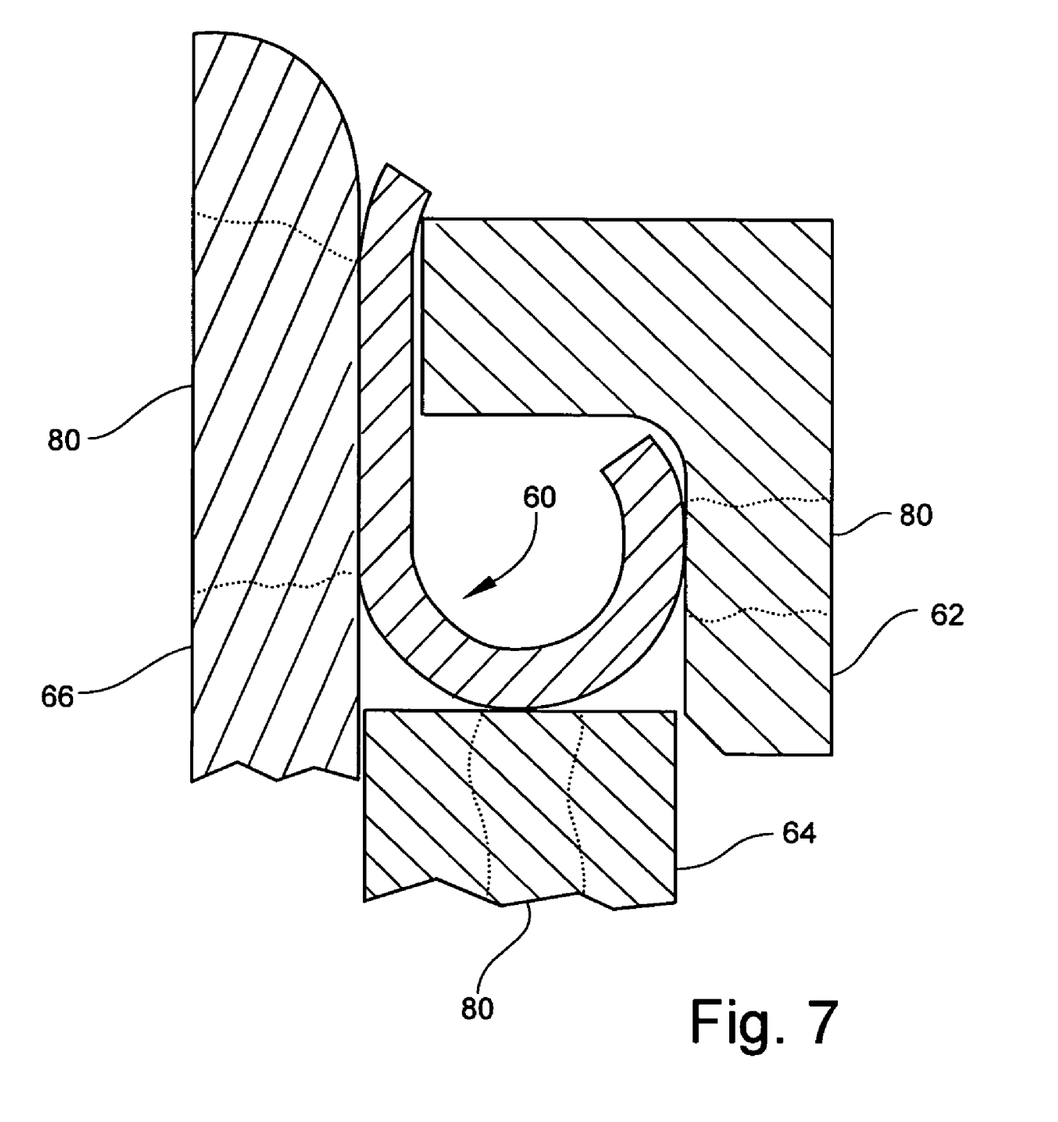
FIG. 7 is a schematic cross-sectional view of an installed seal of the present invention at operating pressure.

FIG. 7 is a view of an installed seal, similar to the view shown in FIG. 5. However, FIG. 7 shows seal 60 at exemplicative high operating pressure of 30,000 psi deflecting the walls of the seal wherein the seal 60 is not completely deformed. The darker areas 80 on the body 62, retaining wall 64 and probe 66 show higher stress contact regions.

Naturally, variations in the seal are contemplated. For example, the longitudinally extending portion could be conical or have a slight curve. The c-shaped portion could have variations and flats and need not be uniform. All shapes could be slightly irregular.

Various coatings, including silver or gold, may be beneficially applied to the seal or its contact surfaces in order to improve its sealing efficiency. For dynamic applications, special anti-galling, low-friction coatings may be applied. Thus, sealing contact areas may be coated with soft, lubricious and/or anti-galling materials.

It is to be understood that the invention is not limited to the illustrations described and shown herein, which are deemed to be merely illustrative of the best modes of carrying out the invention, and which are susceptible of modification of form, size, and arrangement of parts and details of operation. Rather, the invention is intended to encompass all such modifications which are within the spirit and scope as defined by the claims.

The invention claimed is:

1. An annular axial seal consisting of:
   a linear section consisting of opposite ends, a first side in a first plane and an opposite second side in a second plane, said second plane being parallel to said first plane;
   a curled section contiguous with one of said ends of said linear section, said curled section curling in a first direction to a distal end, said curled section curling in said first direction In accordance with a predetermined radius and predetermined distance such that said distal end of said curled section is located directly across from said first side of said linear section;
   said linear section and said curled section providing a "J" shaped cross-section; and
   a tip portion contiguous with the opposite end of said linear section such that said linear section is between said tip portion and said curled section, said tip portion being slightly curved with respect to said linear section such that said tip portion breaks said first plane, said tip portion having an end that does not directly face said distal end of said curled section.

2. The annular axial seal according to claim 1 wherein said annular axial seal is metallic.

* * * * *